United States Patent [19]

Ooishi et al.

[11] Patent Number: 5,026,412
[45] Date of Patent: Jun. 25, 1991

[54] PRODUCTION PROCESS OF MACHINABLE CERAMICS

[75] Inventors: Takashi Ooishi, Tochigi; Akira Matsumoto, Funabashi, both of Japan

[73] Assignee: Mitsui Mining Company, Limited, Tokyo, Japan

[21] Appl. No.: 588,724

[22] Filed: Sep. 27, 1990

[30] Foreign Application Priority Data

Oct. 3, 1989 [JP] Japan ................................. 1-257070

[51] Int. Cl.$^5$ .............................................. C03C 10/16
[52] U.S. Cl. ...................................... 65/18.1; 65/33; 501/3
[58] Field of Search ................... 501/3, 153, 141, 146, 501/151; 65/18.1, 18.2, 18.3, 33; 264/66, 67

[56] References Cited

U.S. PATENT DOCUMENTS 3,756,838  9/1973  Beall ........................................ 501/3
4,777,151 10/1988  Koba et al. ............................. 501/3

Primary Examiner—Richard V. Fisher
Assistant Examiner—John M. Hoffmann
Attorney, Agent, or Firm—Fisher, Christen & Sabol

[57] ABSTRACT

Machinable ceramics with 30–60 vol. % of fine crystals of fluorophlogopite, a synthetic mica, evenly dispersed in a vitreous matrix is produced using as principal raw materials kaolin and activated clay, which are natural minerals, other than metal oxides themselves. According to the production process, a mixture of fine particulate raw materials is calcined under first heat treatment conditions in which a maximum temperature is in the range of 1,000°–1,100° C. The raw materials include kaolin and activated clay as principal raw materials, Mg-containing, K-containing and F-containing compounds as auxiliary raw materials and $B_2O_3$ as a sintering aid. The resulting calcined mass is ground into fine particles, followed by the formation of a green body of a desired shape. The green body is then sintered into a fired body under second heat treatment conditions in which a maximum temperature is in the range of 1,100°–1,250° C.

11 Claims, No Drawings

PRODUCTION PROCESS OF MACHINABLE CERAMICS

BACKGROUND OF THE INVENTION

1) Field of the Invention

The present invention relates to a process for producing machinable ceramics containing fine crystals of fluorophlogopite dispersed in a vitreous matrix.

2) Description of the Related Art

Glass ceramics with fine crystals of mica evenly dispersed in a vitreous matrix have good machinability and excellent electrical and thermal properties are considered as promising materials for the enlargement of the application field of fine ceramics. In particular, glass ceramics containing fine particles of fluorophlogopite dispersed therein are useful materials also excellent in high-temperature stability.

Conventional processes for the production of fluorophlogopite-crystal-containing machinable ceramics include, for example, (1) processes in which glass obtained by fusing and then solidifying a mixture of raw materials is heated again to form crystals of fluorophlogopite in the glass, (2) processes in which a mass obtained by subjecting a gel of a precursor such as a metal alkoxide compound to heat treatment is ground, shaped and then heat-treated, whereby crystals of fluorophlogopite are formed, and (3) processes in which crystals of fluorophlogopite and a phosphate glass as a binder are mixed and are press-formed in a state heated in a suitable mold, followed by annealing.

In one example of the processes (1), a homogeneous glass batch is prepared using high-quality raw materials. The batch is fused at 1,300°–1,450° C. in a closed vessel, whereby a homogeneous melt is formed. This melt is then cooled into a glass body of a desired shape. The glass body is thereafter heated and maintained at 750°–850° C. so that the formation and growth nuclei of fluorophlogopite crystals are induced. The glass body is then heated and maintained at 850°–1,100° C., whereby the growth of crystals is allowed to proceed to completion (see Japanese Patent Application Laid-Open No. 2427/1972). Another example of the processes (1) is found in Japanese Patent Application Laid-Open No. 72654/1986 in which a mixture of pottery stones as principal raw materials, a fluorine compound, etc., are fused and formed into a glass body, followed by the crystallization of the glass body at 1,100°–1,360° C. in the presence of a volatile fluorine compound in a closed vessel.

As one example of the processes (2), an alkoxide compound and a non-alkoxide compound, the latter being soluble in a polar solvent, are mixed and dissolved or dispersed in a polar solvent and then heated, whereby the compounds are hydrolyzed into a gel-like state. The resultant gel is dried so that the polar solvent is caused to evaporate. The dry gel thus obtained is subjected to heat treatment at 800°–1,100° C. to drive off chemically-bonded organic components, whereby green crystals of fluorophlogopite are formed These green crystals are then into a green body. The green body is heat-treated 1,100°–1,300° C. so that fluorophlogopite crystals are allowed to grow (see Japanese Patent Application Laid-Open No. 178425/1986).

The processes (3) include the process disclosed in Japanese Patent Publication No. 21381/1970, in which a phosphate glass is mixed as a binder in fluorophlogopite crystals, the resultant mixture is heated to 500°–700° C. in a suitable mold and then press-formed there under a pressure of about 500–700 kg/cm², and the thus-formed body is thereafter annealed at about 350° C.

The production processes (1) in which the formation and growth of fluorophlogopite crystals are effected via a glass body individually comprise the following steps: fusion of raw materials, formation of a glass body from a melt, annealing, and crystallization. In the raw-material-fusing step, raw materials containing a fluorine component and 5–15%, on an oxide weight basis, of $B_2O_3$ as a flux are fused at an elevated temperature of 1,300°–1,450° C. A vessel which is employed to fuse such raw materials must be made of a material (e.g., platinum) inert to the raw materials to avoid wearing. Means for minimizing evaporation of the raw materials, such as sealing means, is also indispensable.

In the glass-body-forming step, the above melt is poured into a desired mold at a temperature high enough to allow the melt to retain fluidity, and is then cooled to a temperature below the transition range thereof. Such a casting process however requires many molds for each desired shape upon mass production. The processes (1) therefore involves a problem in mass productivity.

The processes (1) are accompanied by further problems such that they need high thermal energy consumption; require a hermetic state to avoid evaporation of one or more components during the fusion or to maintain a fluorine-rich atmosphere upon crystallization; have difficulties in forming, for example, pipelike products because of the use of the casting technique of melt; may result, depending on the shape, in the occurence of a large machining loss when products of a desired shape are cut out since they are crystallized in the shape of the initial glass bodies; and the products have low heat resistance due to the abundant inclusion of $B_2O_3$ on an oxide basis.

Each of the production processes (2) in which sintered products are obtained from alkoxide compounds and the like via gelation basically comprises the following steps: preparation of raw materials, gelation, first heat treatment, forming, and second heat treatment. Unless the moisture control of each raw material including a polar solvent is fully carried out during the preparation and gelation step for the raw materials, gelation takes place in the course of heating of the raw materials and an intended gel cannot be obtained. Accurate control of the reaction conditions is also necessary in the hydrolysis for the gelation in order to obtain a gel of stable quality. The first heat treatment step which is conducted at 800°–1,100° C. includes removal of chemically-bonded organic components contained in the dried gel, formation of fluorophlogopite crystals, and sintering to an appropriate degree. To achieve complete removal of the organic components, well-designed careful procedures are indispensable, including the need for a special method for filling the dried gel in a vessel and exposure to sufficient air (oxygen). Otherwise, the organic components tend to undergo carbonization and to remain in the heat-treated products, so that they may lead to impurities and/or pores in the final product. As a method for eliminating carbides by evaporation, it may be contemplated of exposing the final product to an oxidizing atmosphere of high temperature for a long time. This method however involves the potential problem that the fluorophlogopite crystals thus formed may be modified or the sintering may proceed too much.

Even up to the step described above, difficulties are encountered upon setting conditions and conducting the steps, such as the control of gelation and the removal of organic components, so that products of stable quality can hardly be obtained. Further, for the second heat treatment, high temperature of at least 1,100° C. is used to promote growth of fluorophlogopite crystals. Since fluorophlogopite crystals may undergo decomposition at such high temperature, it is necessary to control the heating by burying each green body in a fluorophlogopite powder called "packing powder" while sintering it in order to prevent decomposition.

Each of the production processes (3) in which fluorophlogopite crystals and a phosphate glass as a binder are heated, formed and annealed comprises the following steps: preparation of raw materials, heating and forming, and annealing.

In the raw material preparation step, glass powder and fluorophlogopite crystals are thoroughly mixed. Unless the mixing in this step is sufficient, the fluorophlogopite crystals may orient, thereby making it difficult or impossible to obtain a product with fluorophlogopite crystals evenly dispersed therein. This leads to a reduction in machinability. The production processes (3) are accompanied by another problem that extreme difficulties are encountered upon uniform dispersion and mixing of tabular or laminar fluorophlogopite crystals with glass powder. In the heating and forming step, the mixture is heated to 500°-700° C. and is then formed. The glass powder however has a composition of low melting point in view of the heat resistance of the material of the mold. Corollary to this, the heat resistance of the resulting product is considerably low.

SUMMARY OF THE INVENTION

An object of the present invention is to overcome the above-described problems of the related art and to provide a simple process for the production of machinable ceramics having excellent properties.

The present inventors have proceeded with an extensive investigation to develop a process for the production of fluorophlogopite-containing machinable ceramics. As a result, it has been found that glass ceramics with fine crystals of fluorophlogopite evenly dispersed in a vitreous matrix can be produced by using as principal raw materials specific minerals easily available from natural resources and subjecting them to a solid-phase reaction under particular conditions, leading to the completion of this invention.

In one aspect of the present invention, there is thus provided a process for the production of machinable ceramics. The process comprises the following steps:

calcining a mixture of fine particulate raw materials under first heat treatment conditions in which a maximum temperature is in a range of 1,000°-1,100° C., said raw materials comprising kaolin and activated clay as principal raw materials, Mg-containing, K-containing and F-containing compounds as auxiliary raw materials and $B_2O_3$ as a sintering aid, whereby a fluorophlogopite- and glass-containing calcined mass containing 30-60 vol. % of fluorophlogopite crystals is obtained;

grinding said calcined mass into fine particles;

forming a green body of a desired shape from said fine particles; and sintering said green body into a fired body under second heat treatment conditions in which a maximum temperature of said fired body is in a range of 1,100°-1,250° C.

It is to be noted that the Mg-containing, K-containing and F-containing compounds are not necessarily limited to three types of compounds. As long as Mg, K and F are significantly finished, one, two, three or even more compounds can be used. For example, in the case of a compound containing Mg, K and F, this compound can be used as a single source for Mg, K and F. When a compound contains both Mg and F is used, this compound can be used in combination with a K-containing compound, a K- and F-containing compound, or a K-containing compound and an F-containing compound.

The process of the present invention includes the following preferred embodiments:

Firstly, the fine particulate raw materials are proportioned such that the fired body has the following composition on an oxide weight basis:

| F | 2-15% |
|---|---|
| $K_2O$ | 3-15% |
| MgO | 10-25% |
| $B_2O_3$ | 1-3% |
| $Al_2O_3$ | 10-20% |
| $SiO_2$ | 35-60% |

Secondly, the kaolin and activated clay in the mixture of the fine particulate raw materials are principal sources for $SiO_2$ and $Al_2O_3$ components in the composition of the fired body, and the weight ratio of the kaolin to the activated clay ranges from 0.5 to 5.0.

Thirdly, the average particle size of the mixture of the fine particulate raw materials is not greater than 5 μm.

Fourthly, the first heat treatment conditions comprise heating for 1-10 hours in a first temperature range of 350°-600° C., heating for 1-10 hours in a second temperature range of 700°-900° C., and heating for 1-10 hours in a third temperature range of 1,000°-1,100° C.

Fifthly, the average particle size of the fine particles of the calcined mass is not greater than 5 μm.

Sixthly, the fired body contains 30-60 vol. % of fluorophlogopite crystals.

In the present invention, each amount (vol. %) of fluorophlogopite crystals is a value as measured based on a scanning electron micrograph. It is possible to express the proportion of fluorophlogopite crystals in terms of wt. % on the basis of peak intensities of X-ray diffraction. The method using an electron microscope has however been adopted in this invention, because the content (wt. %) of fluorophlogopite crystals is certainly one of factors contributing the machinability but the state of inclusion of crystals, specifically, the inclusion of fluorophlogopite crystals of 5-20 μm in an entangled state is more important. Similarly, each size of fluorophlogopite crystals is also a value obtained by electron microscopic observation. Incidentally, 30-60 vol. % of fluorophlogopite crystals is equivalent approximately to 30-65 wt. %.

Essential features of the production process of this invention can be summarized as follows:

A first feature resides in the use of kaolin and activated clay, which are mineralogically classifieed as natural minerals, as principal raw materials. It is important to note that replacement of kaolin and activated clay by equivalent metal oxides, $SiO_2$ and $Al_2O_3$ cannot provide good machinable ceramics. Namely, it is essential to use the principal raw materials which are natural minerals. The use of kaolin and activated clay enable a solid-phase reaction for forming fluorophlogopite crystals by the calcination treatment, and elimination of the environmental control in the calcination treatment and the sintering treatment.

The production process of the present invention has the following advantages and is an extremely meritorious process from the industrial standpoint.

1) Use of kaolin and activated clay as raw materials permits the formation of fluorophlogopite by solid-phase reactions at low temperature. The temperature of the heat treatment can hence be lowered compared to the fusion process, so that the energy cost can be reduced and the potential problem of vessel and/or kiln damages due to evaporation of fluorine component can be obviated. In addition, it is no longer required to add a flux in a large proportion so that the high-temperature resistance of the product is not lowered.

2) No evaporation of fluorine component takes place during sintering because fluorophlogopite crystals are formed by the low-temperature solid-phase reactions. It is hence unnecessary to maintain the interior of a vessel under a fluorine atmosphere, thereby making it possible to perform sintering in the atmosphere (i.e., an oxidizing atmosphere).

3) The production process has been simplified, and products of stable quality can be produced in quantity.

4) The raw materials can be formed into a desired shape and then sintered without the need for conversion into a fused state. It is therefore possible to obtain a sintered product whose shape is close to that of the intended product. The production of waste pieces can therefore be reduced significantly compared with the conventional processes in which products of a desired shape are cut out from block-, plate- or lump-shaped sintered bodies.

Mechanism of the attainment of these advantages owing to the use of the specific principal raw materials easily available from natural resources has not been elucidated. It will be left to future investigations.

DETAILED DESCRIPTION OF THE INVENTION AND PREFERRED EMBODIMENTS

In the process of the present invention, kaolin and activated clay are used as principal raw materials. According to typical analysis data of kaolin, the contents of $SiO_2$ and $Al_2O_3$ are 40-50 wt. % and 30-45 wt. %, respectively. Kaolin in the present invention is a compound which contains mineralogically defined kaolin minerals consisting of kaolinite, dickite, nacrite, halloysite, metahalloysite and/or the like. As long as the contents of $SiO_2$ and $Al_2O_3$ substantially fall within the above ranges, any kaolin minerals can be used irrespective of its kind. Activated clay is obtained by treating an $SiO_2$-containing mineral such as montmorillonite or halloysite with an acid, so that unnecessary components have been removed and the content of $SiO_2$ has been raised. There are many processes for the production of such activated clay. Any production process can be employed in so far as the resulting activated clay has a high $SiO_2$ content. Activated clay commonly employed as a raw material in the industry can be used as is in the present invention. However, it is preferable to use activated clay whose $SiO_2$ content is 98 wt. % or higher, but which cannot be replaced by metal oxides, $SiO_2$.

Further, the content of $Fe_2O_3$ contained as an impurity in kaolin and activated clay is preferably not higher than 0.3 wt. % in view of coloration to products and electrical properties.

Kaolin and activated clay serve as principal $SiO_2$ and $Al_2O_3$ sources. The weight ratio of kaolin to activated clay may preferably be 0.5-5.0, with 1.5-2.6 being more preferred. They are used to give 35-60% $SiO_2$ and 10-20% $Al_2O_3$ in the chemical composition of the fired body (i.e., machinable ceramics).

If kaolin and activated clay are used at a weight ratio outside the above range, the $Al_2O_3$ content and/or $SiO_2$ content of the fired body fall outside their respective preferred ranges so that physical properties such as sinterability an machinability may be adversely affected.

Although synthesis of fluorophlogopite is still feasible even if $SiO_2$ and/or $Al_2O_3$ which are generally used in the form of single compounds are used as $SiO_2$ and/or $Al_2O_3$ sources instead of kaolin and/or activated clay, the sinterability is poor. Powder mixtures containing 1-3% of $B_2O_3$ also have the same problem. In these cases, it is difficult to obtain dense machinable ceramics having excellent machinability.

Within the breadth of the investigation of the present inventors, no dense machinable ceramics having excellent machinability was obtained from the use of natural minerals other than kaolin and activated clay, for example, talc and diatomaceous earth because formation and growth of fluorophlogopite crystals were not sufficient or formation of undesired byproducts such as leucite ($KAlSi_2O_6$) took place. Namely, the use of kaolin and activated clay as principal raw materials in this invention means that they are used as sources for $SiO_2$ and $Al_2O_3$ in the fired product and other raw materials, for examples, single compounds and talc are not used as $SiO_2$ and $Al_2O_3$ sources. It is however to be noted that the present invention does not exclude the possibility of inclusion of minor amounts of $SiO_2$ and/or $Al_2O_3$ from other raw materials employed in combination.

In the present invention, it is preferable that the contribution of the kaolin to the $Al_2O_3$ component in the fired body is at least 95% and the total contribution of the kaolin and activated clay to the $SiO_2$ component in the fired body is at least 80%.

To form fluorophlogopite, Mg-containing, K-containing and F-containing compounds are used as auxiliary raw materials in addition to kaolin and activated clay. No particular limitation is imposed on the compounds to be used here. Compounds generally available on the market, such as MgO, KF and $K_2SiF_6$ can be used in a desired combination such that the chemical composition of the resulting fired body falls within the range specified above.

All the above raw materials are proportioned such that the fired body has the following composition on an oxide weight basis 35-60% $SiO_2$, 10-20% $Al_2O_3$, 10-25% MgO, 3-15% $K_2O$, 2-15% F and 1-3% $B_2O_3$. They are then mixed and ground preferably until the average particle size of each of the raw materials is reduced to 5 μm or smaller. In respect of the time of addition of the $B_2O_3$ source, it can be added concurrently with all the other raw materials or at the stage that the calcined mass is ground in the subsequent step. The sinterability, the physical properties of the product, and the like are not affected by differences in the time of addition of the $B_2O_3$ source.

If any one of the above components falls outside its preferred range specified above, the amount of formation of fluorophlogopite crystals and/or the degree of their growth vary so that the machinability, sinterability and the like may be impaired. For example, an excessively high $SiO_2$ content leads to a higher content of glass and a lower content of fluorophlogopite crystals. As a result, the machinability and heat resistance are both reduced. If the content of $SiO_2$ becomes lower conversely, more fluorophlogopite crystals are formed but the sinterability is impaired. Further, byproducts such as forsterite ($Mg_2SiO_2$) and leucite ($KAlSi_2O_6$) may be formed depending on the composition, resulting in the formation of glass ceramics with deteriorated physical properties. $B_2O_3$ contents lower than 1 wt. % result in insufficient sintering in the firing step so that fired body of high density may not be obtained. $B_2O_3$ contents higher that 3 wt. % lead to the formation of more glass so that foaming may take place during sintering or products with lowered machinability and heat resistance may be formed.

The mixing and grinding step may be performed by a dry method. In view of the achievement of intimate and uniform mixing of the individual raw materials proportioned, wet mixing and grinding in an apparatus such as a wet ball mill is preferred. If the grinding is insufficient and the average particle size is greater than 5 $\mu$m or if the mixing is in sufficient, one or more mineral phases adversely affecting the properties of the resulting fired body, such as leucite, are prone to occur. Such insufficient grinding or mixing is therefore not preferred.

In the case of wet mixing and grinding, the resulting mixture of the raw materials is dried in a drier such as a spray drier and then filled in a vessel or the like. The mixture is thereafter subjected to heat treatment (calcination) under the first heat treatment conditions in which the maximum temperature is in the range of 1,000°–1,100° C., whereby volatile components such as bound water of kaolin are eliminated and, at the same time, 30–60 vol. % of fluorophlogopite crystals are formed.

Further, sintering is allowed to proceed to some extent at this stage. This is to minimize the firing shrinkage in the subsequent firing step, so that the fired body can be obtained substantially free of deformation with improved dimensional accuracy.

To obtain a product in which fluorophlogopite is dispersed evenly in a minute form, it is preferable to conduct the heat treatment step in three stages under the first conditions as will be described next. Namely, the mixture of the raw materials is first maintained at 350°–600° C. for 1–10 hours so that dehydration of kaolin is achieved primarily. The mixture is next maintained at 700°–900° C. for 1–10 hours so that some fluorophlogopite crystals are formed. The resulting mixture is then maintained at 1,000°–1,100° C. for 1–10 hours, whereby fluorophlogopite crystals are formed and allowed to grow.

In the present invention, the first heat treatment conditions that the maximum temperature is in the range of 1,000°–1,100° C. means that the maximum temperature reaches 1,000°–1,100° C. in the course of a single-stage treatment in which the temperature is raised linearly or exponentially, the aforementioned 3-stage treatment in which the temperature range is divided into three, or a treatment under conditions in which the temperature is raised at varied rates.

In the heat treatment step, solid-phase reactions take place at the boundaries of the individual particles subsequent to the evaporation of volatile components, so that fluorophlogopite is formed as fine particles. If the maximum temperature is lower than 1,000° C. in this heat treatment, fluorophlogopite cannot be formed to sufficient extent, leading to large shrinkage in the subsequent firing step and resulting in a fired body having a low fluorophlogopite content.

If the maximum temperature exceeds 1,100° C., the sintering proceeds so much that a calcined mass with reduced grindability is formed and growth of fluorophlogopite crystals is allowed to proceed excessively. This excessive growth makes it difficult to achieve even distribution of the crystals and also leads to a green body having poor sinterability. Maximum temperatures higher than 1,100° C. are therefore not preferred. The fine particulate fluorophlogopite crystals formed by the above heat treatment may preferably have a largest mass fraction of 1–2 $\mu$m with a view toward achieving even dispersion of fluorophlogopite crystals, in other words, random dispersion of fluorophlogopite crystals without orientation at the time of the formation of a green body.

Specific heat treatment conditions vary to some extent depending on the kinds, proportions and properties of the raw materials employed, the physical properties of the fired body intended, etc. The heat treatment conditions can therefore be suitably determined such that the amount and size of fluorophlogopite crystals fall within their respective ranges specified above.

In the case of a raw material composition free of kaolin and/or activated clay, no sufficient solid-phase reactions take place so that fluorophlogopite can be formed only in a smaller amount.

Next, the calcined mass thus obtained is ground again such that its average particle size is reduced to 5 $\mu$m or smaller. After forming the resultant fine particles into a green body of a desired shape such as a rod-, plate- or block-like shape, the green body is subjected to the sintering step. Since sintering has proceeded to some extent in the heat treatment step in this invention, the green body can be formed in a shape close to the shape of the final product in the forming method. It is only necessary to choose a forming method commensurate with the shape, formability, productivity and the like. One or more forming aids such as binders, dispersants and mold release agents can also be added in suitable amounts as needed. As a typical example of forming method, a forming aid is added to a slurry obtained by wet-grinding a calcined mass. In the case of slip casting, the resulting slurry can be formed as is. In the case of powder forming such as rubber pressing (cold isostatic pressing) or single-screw press-forming, the thus-prepared slurry can be spray-dried, granulated and then formed into a green body.

The green body which has been formed in the desired shape is then placed in a vessel as is, followed by sintering under the second heat treatment conditions in which the maximum temperature is in the range of 1,100°–1,250° C. Owing to the use of the second heat treatment conditions, physical properties are not deteriorated by decomposition of fluorophlogopite crystals in the sintering treatment of the present invention even when the atmosphere is not modified with packing powder or the like. The sintering treatment can provide a dense fired body in which fluorophlogopite crystals of 5–20 $\mu$m are entangled together and their interstices are filled out with a vitreous matrix. Sintering does not proceed fully at sintering temperatures lower than 1,100° C., so that densification does not take plate and fluorophlogopite crystals are allowed to grow only to limited extent. Sintering temperatures higher than 1,250° C. induce decomposition of fluorophlogopite, whereby the machinability is reduced. Sintering temperatures outside the above range are therefore not preferred.

The maximum temperature of the second heat treatment conditions can preferably be maintained for 3–12 hours. Time shorter than 3 hours tends to result in a fired body whose composition is not uniform at the inside thereof due to a delay in temperature increase. On the other hand, time longer than 12 hours allows fluorophlogopite crystals to grow too much so that a fired body of reduced strength tends to result. The time of the maximum temperature should be adjusted depending on conditions such as the maximum temperature, the composition of the intended fired body, the first heat treatment conditions, and the particle size of the fine particles of the calcined mass.

The fired body obtained by the process of this invention is machinable ceramics which has the following chemical compositions: 35–60% $SiO_2$, 10–20% $Al_2O_3$, 10–25% $MgO$, 3–15% $K_2O$, 2–15% F and 1–3% $B_2O_3$, all on an oxide weight basis, and which contains 30–60 vol. % of fluorophlogopite crystals. It has the structure that fluorophlogopite crystals of 5–20 $\mu$m are evenly dispersed in a mutually-entangled form in a vitreous matrix. Its density is as high as 2.48–2.67 g/cm while its porosity is as low as 2–6%. Further, a vitreous layer formed on the surface of the fired body after the sintering is as thin as about 100 $\mu$m or less. The fired body has good machinability.

The process of the present invention will hereinafter be described more specifically, by the following examples.

The machinability of each fired body was evaluated by the level of ease upon drilling the body. Namely, sintered bodies which required not more than 50 seconds for drilling them to the depth of 10 mm under the load of 5 kg at the revolution speed of 435 rpm by a superhard drill having a diameter of 5 mm were rated "good", while those required more than 50 seconds were rated "poor".

EXAMPLE 1

Combined were 830 g of kaolin A whose analysis data are shown in Table 2, 466 g of activated clay whose analysis data are given in Table 2, 326 g of MgO, 234 g of $K_2SiF_6$, 138 g of KF and 40 g of $B_2O_3$. They were mixed and ground to an average particle size of 3.7 $\mu$m in a wet ball mill. After dried in a spray drier, the particles were heated in an electric furnace so that they were heat-treated at 380°–420° C. for 4 hours, at 730°–770° C. for 6 hours, and then at 1,060–1,090 for 3 hours. Fluorophlogopite crystals in the thus heat-treated mass accounted for about 50 vol. % and their size was about 1 $\mu$m.

The heat-treated mass was added with water and 1.0 wt. % of a PVA binder and ground to an average particle size of 3.5 $\mu$m by wet grinding. The resultant slurry was dried in a spray drier and was then granulated.

The particles thus formed were subjected to single-screw press-forming under the pressure of 700 kgf/cm$^2$, whereby a plate-like green body of 260 mm×260 mm×20 mm was formed. The green body was placed, as was, in an alumina-made firing vessel. Namely, without any closed atmosphere or packing powder unlike the prior art, the green body was placed directly in the vessel. In a manner known per se in the art, the green body was treated in a degassing step and then heated at 1,200°–1,250° C. for 5 hours, so that the green body was sintered.

The fired body thus obtained had the following composition: 45.7% $SiO_2$, 16.1% $Al_2O_3$, 16.7% MgO, 10.9% $K_2O$, 8.5% F and 2.0% $B_2O_3$, all on an oxide weight basis. It was ceramics containing about 50 vol. % of fluorophlogopite crystals of 5–15 $\mu$m long in a vitreous matrix. Data of its principal physical properties are shown in Table 1. The physical properties were all good. Its machinability was also evaluated by usual machining apparatus, i.e., milling machine, lathe and drilling machine. As a result, it showed good machinability in cutting, lathe turning, drilling, polishing and the like.

Further, a cut surface of the fired body was observed by a scanning electron microscope. As a result, it was found that its surface portion was covered with a thin layer of about 100 $\mu$m, which appeared vitreous, and the inside was formed of fluorophlogopite crystals and glass dispersed evenly and entangled together.

EXAMPLES 2–5

Fired bodies were obtained in a similar manner to Example 1 except that the kinds and proportions of the raw materials were changed as shown in Table 3. The compositions and properties of the fired bodies thus obtained are shown in Table 4. The fired bodies were all machinable ceramics having good properties. Incidentally, analysis data of kaolin B are given in Table 2.

EXAMPLE 6

A formed body was obtained under similar conditions to Example 1. The formed body was heated at 1,150°–1,200° C. for 12 hours, whereby the formed body Was sintered. Properties of the fired body so obtained are shown in Table 4. It was machinable ceramics having good properties.

COMPARATIVE EXAMPLES 1–10

Fired bodies were produced in a similar manner to Example 1 except that the proportions of the raw materials were changed outside their respective preferred ranges specified by the present invention as given in Table 5, The results are summarized in Table 6. It is envisaged that the sintering did not proceed sufficiently in each comparative example and the fired body had drawbacks such as the low density, the formation of fluorophlogopite crystals in a small amount only and poor machinability.

TABLE 1

| Bulk density (g/cm$^3$) | 2.55 |
| Water absorption (%) | 0.0 |
| Flexural strength (kgf/cm$^2$) | 1.100 |
| Vickers hardness (kgf/cm$^2$) | 245 |
| Volume resistivity ($\Omega \cdot$ cm) | 2.3 × 10$^{15}$ |
| Dielectric constant (f = 1 MHz) | 6 |
| Dielectric loss tangent (f = 1 MHz) | 0.004 |
| Coeff. of thermal expansion (/°C.) (Room temperature to 800° C.) | 10.3 × 10$^6$ |

TABLE 2

| | Ignition loss | Analysis Data (wt. %) | | | | | | | |
| | | $SiO_2$ | $Al_2O_3$ | $Fe_2O_3$ | CaO | MgO | $K_2O$ | $Na_2O$ | $TiO_2$ |
| --- | --- | --- | --- | --- | --- | --- | --- | --- | --- |
| Kaolin A | 14.1 | 47.3 | 37.4 | 0.24 | — | — | 0.28 | — | 0.18 |

TABLE 2-continued

| | Analysis Data (wt. %) | | | | | | | | |
|---|---|---|---|---|---|---|---|---|---|
| | Ignition loss | SiO$_2$ | Al$_2$O$_3$ | Fe$_2$O$_3$ | CaO | MgO | K$_2$O | Na$_2$O | TiO$_2$ |
| Kaolin B | 13.6 | 50.3 | 35.5 | 0.19 | 0.01 | 0.01 | 0.01 | 0.08 | 0.09 |
| Activated clay | 4.5 | 94.0 | 1.0 | 0.03 | 0.05 | 0.01 | — | — | — |

TABLE 3

| Example No. | Batch Compositions (wt. %) | | | | | | |
|---|---|---|---|---|---|---|---|
| | Kaolin A | Kaolin B | Activated clay | MgO | K$_2$SiF$_6$ | KF | B$_2$O$_3$ |
| 2 | 42.4 | | 16.7 | 15.8 | 24.1 | | 1.0 |
| 3 | 40.3 | | 22.9 | 15.8 | 11.4 | 6.7 | 3.0 |
| 4 | | 43.0 | 20.7 | 16.0 | 11.6 | 6.8 | 2.0 |
| 5 | 49.9 | | 12.5 | 17.8 | 11.3 | 6.6 | 1.9 |
| 6 | 40.8 | | 22.9 | 16.0 | 11.5 | 6.8 | 2.0 |

TABLE 4

| Example No. | Properties of Fired Bodies | | | | | | | | |
|---|---|---|---|---|---|---|---|---|---|
| | Composition (wt. %) | | | | | | Content of fluorophlogopite (Vol. %) | Density (g/cm$^3$) | Machinability | Porosity (%) |
| | SiO$_2$ | Al$_2$O$_3$ | MgO | K$_2$O | F | B$_2$O$_3$ | | | | |
| 2 | 42.9 | 16.7 | 16.1 | 10.5 | 12.7 | 1.0 | App. 50 | 2.57 | Good | 4.0 |
| 3 | 45.2 | 16.3 | 16.4 | 10.6 | 8.4 | 3.0 | App. 50 | 2.54 | Good | 5.0 |
| 4 | 45.9 | 16.7 | 16.6 | 10.9 | 8.5 | 2.1 | App. 50 | 2.56 | Good | 4.5 |
| 5 | 40.4 | 19.8 | 18.8 | 10.7 | 8.3 | 2.0 | App. 45 | 2.48 | Good | 6.0 |
| 6 | 45.5 | 16.2 | 16.8 | 11.0 | 8.0 | 2.0 | App. 50 | 2.56 | Good | 4.5 |

TABLE 5

| Comparative Example No. | Batch Compositions (wt. %) | | | | | | | | | |
|---|---|---|---|---|---|---|---|---|---|---|
| | Kaolin A | Talc (A or B) | Diatomaceous earth | Activated clay | MgO | K$_2$SiF$_6$ | KF | B$_2$O$_3$ | CaF$_2$ | H$_3$PO$_4$ |
| 1 | 45.2 | A 33.9 | | | 4.0 | 10.6 | 6.3 | | | |
| 2 | 43.9 | B 33.4 | | | 4.3 | 10.3 | 6.1 | 2.0 | | |
| 3 | 41.1 | B 35.5 | | | 5.0 | 11.6 | 6.8 | | | |
| 4 | 41.5 | | | 23.6 | 16.3 | 11.7 | 6.9 | | | |
| 5 | 43.7 | | | 21.8 | 14.3 | 10.3 | 6.1 | 4.0 | | |
| 6 | 39.5 | | | 22.5 | 15.5 | 11.2 | 6.6 | | 4.8 | |
| 7 | 37.7 | | | 21.4 | 14.8 | 10.7 | 6.3 | | | 9.1 |
| 8 | 32.8 | | 28.8 | | 17.0 | 12.2 | 7.2 | 2.0 | | |
| 9 | 13.0 | | | 51.9 | 15.5 | 11.1 | 6.6 | 2.0 | | |
| 10 | 53.4 | | | 9.7 | 16.3 | 11.7 | 6.9 | 2.0 | | |

TABLE 6

| Comparative Example No. | Properties of Fired Bodies | | | | | | Density (g/cm$^3$) | Machinability | Remarks |
|---|---|---|---|---|---|---|---|---|---|
| | Composition (wt. %) | | | | | | | | |
| | SiO$_2$ | Al$_2$O$_3$ | MgO | K$_2$O | F | B$_2$O$_3$ | | | |
| 1 | 48.2 | 17.9 | 15.6 | 10.2 | 8.0 | | 2.29 | Good | Not densified |
| 2 | 47.2 | 17.5 | 15.7 | 9.9 | 7.8 | 2.0 | 2.39 | Good | Not densified |
| 3 | 46.9 | 16.3 | 17.0 | 11.0 | 8.7 | | 2.18 | Good | Not densified |
| 4 | 46.9 | 16.4 | 17.0 | 11.0 | 8.7 | | 2.55 | Poor | Many pores of app. 100 μm |
| 5 | 46.2 | 17.2 | 15.0 | 9.9 | 7.7 | 4.0 | 2.17 | Good | Many pores of several hundreds μm |
| 6 | 45.3 | 15.6 | 16.3 | 10.8 | 8.3 | CaO 3.7 | 2.25 | Good | Not densified |
| 7 | 43.6 | 15.0 | 15.8 | 10.4 | 8.1 | P$_2$O$_5$ 8.1 | 2.50 | Poor | Hard |
| 8 | 46.1 | 15.9 | 16.7 | 10.9 | 8.5 | 1.96 | 2.33 | Good | Not densified |
| 9 | 58.9 | 5.4 | 15.7 | 10.2 | 8.0 | 2.0 | 2.45 | Poor | Hard, many pores of several hundreds μm |
| 10 | 39.6 | 21.1 | 17.2 | 11.2 | 8.8 | 2.1 | 2.40 | Good | Not densified |

We claim:

1. A process for the production of machinable ceramics, which comprises the following steps:
   calcining a mixture of fine particulate raw materials under first heat treatment conditions in which a maximum temperature is in the range of 1,000°–1,100° C., said raw materials comprising kaolin and activated clay as principal raw materials, Mg-containing, K-containing and F-containing compounds as auxiliary raw materials and B$_2$O$_3$ as a sintering aid, whereby a fluorophlogopite- and glass-containing calcined mass containing 30–60 vol. % of fluorophlogopite crystals is obtained;
   grinding said calcined mass into fine particles;
   forming a green body of a desired shape from said fine particles; and
   sintering said green body into a fired body under second heat treatment conditions in which a maximum temperature is in the range of 1,100°–1,250° C.

2. The process of claim 1, wherein said first heat treatment conditions comprise heating for 1–10 hours in a first temperature range of 350°–600° C., heating for 1–10 hours in a second temperature range of 700°–900° C., and heating for 1–10 hours in a third temperature range of 1,000°–1,100° C.

3. The process of claim 1, wherein said fine particulate raw materials are proportioned such that said fired body has the following composition on an oxide weight basis:

| | |
|---|---|
| F | 2–15% |
| $K_2O$ | 3–15% |
| MgO | 10–25% |
| $B_2O_3$ | 1–3% |
| $Al_2O_3$ | 10–20% |
| $SiO_2$ | 35–60% |

4. The process of claim 1, wherein the kaolin and activated clay in said mixture of said fine particulate raw materials are principal sources for $SiO_2$ and $Al_2O_3$ components in the composition of the fired body and the weight ratio of the kaolin to the activated clay ranges from 0.5 to 5.0.

5. The process of claim 4, wherein the contribution of the kaolin to the $Al_2O_3$ component in said fired body is at least 95% and the total contribution of the kaolin and activated clay to the $SiO_2$ component in said fired body is at least 80%.

6. The process of claim 1, wherein the average particle size of said mixture of said fine particulate raw materials is not greater than 5 μm.

7. The process of claim 1, wherein said mixture of said fine particulate raw materials is prepared by a wet mixing and grinding means.

8. The process of claim 1, wherein the average particle size of said fine particles of said calcined mass is not greater than 5 μm.

9. The process of claim 1, wherein said fired body contains 30–60 vol. % of fluorophlogopite crystals.

10. The process of claim 1, wherein said fine particles of said calcined mass is prepared by grinding said calcined mass by a wet mixing and grinding means.

11. The process of claim 1, wherein said fluorophlogopite crystals in said calcined mass have a largest mass fraction of 1–2 μm.

* * * * *